(12) United States Patent
Riffel

(10) Patent No.: US 8,955,445 B2
(45) Date of Patent: *Feb. 17, 2015

(54) SEED DISTRIBUTION TOWER WITH MODULAR COMPONENTS

(75) Inventor: Jacob R. Riffel, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/485,183

(22) Filed: May 31, 2012

(65) Prior Publication Data

US 2013/0319305 A1    Dec. 5, 2013

(51) Int. Cl.
| | |
|---|---|
| A01C 7/04 | (2006.01) |
| A01C 7/16 | (2006.01) |
| A01C 17/00 | (2006.01) |
| A01C 19/00 | (2006.01) |

(52) U.S. Cl.
USPC ............ 111/175; 111/200; 340/674; 340/684

(58) Field of Classification Search
USPC ......... 111/922, 921, 903, 900, 200, 186–188, 111/175, 174, 170, 118–129; 701/50; 340/684, 674; 310/345
See application file for complete search history.

(56) References Cited

U.S. PATENT DOCUMENTS

| | | |
|---|---|---|
| 5,074,228 A | 12/1991 | Daws |
| 8,656,848 B2 * | 2/2014 | Hubalek et al. ............... 111/175 |
| 2011/0035163 A1 | 2/2011 | Landphair |

OTHER PUBLICATIONS

U.S. Patent Application entitled Seed Distribution Tower for an Air Seeder; U.S. Appl. No. 13/157,890, filed Jun. 10, 2011; Inventors: Verne A. Hubalek and Jacob R. Riffel; Assignee: Great Plains Manufacturing, Inc.

* cited by examiner

Primary Examiner — Christopher J Novosad
(74) Attorney, Agent, or Firm — Hovey Williams LLP

(57) ABSTRACT

The seed distribution tower of an air seeder has a distribution head that splits a single, primary stream of conveying air and seeds into a plurality of secondary streams for delivery to openers that deposit the seeds into the ground as the seeder advances. The outlets through which the secondary streams exit the head are constructed as modules that can be individually installed and replaced without disassembling the entire head. Shut-off valves and/or flow sensors may or may not be incorporated into certain or all of the modules to provide optimum user flexibility.

19 Claims, 19 Drawing Sheets

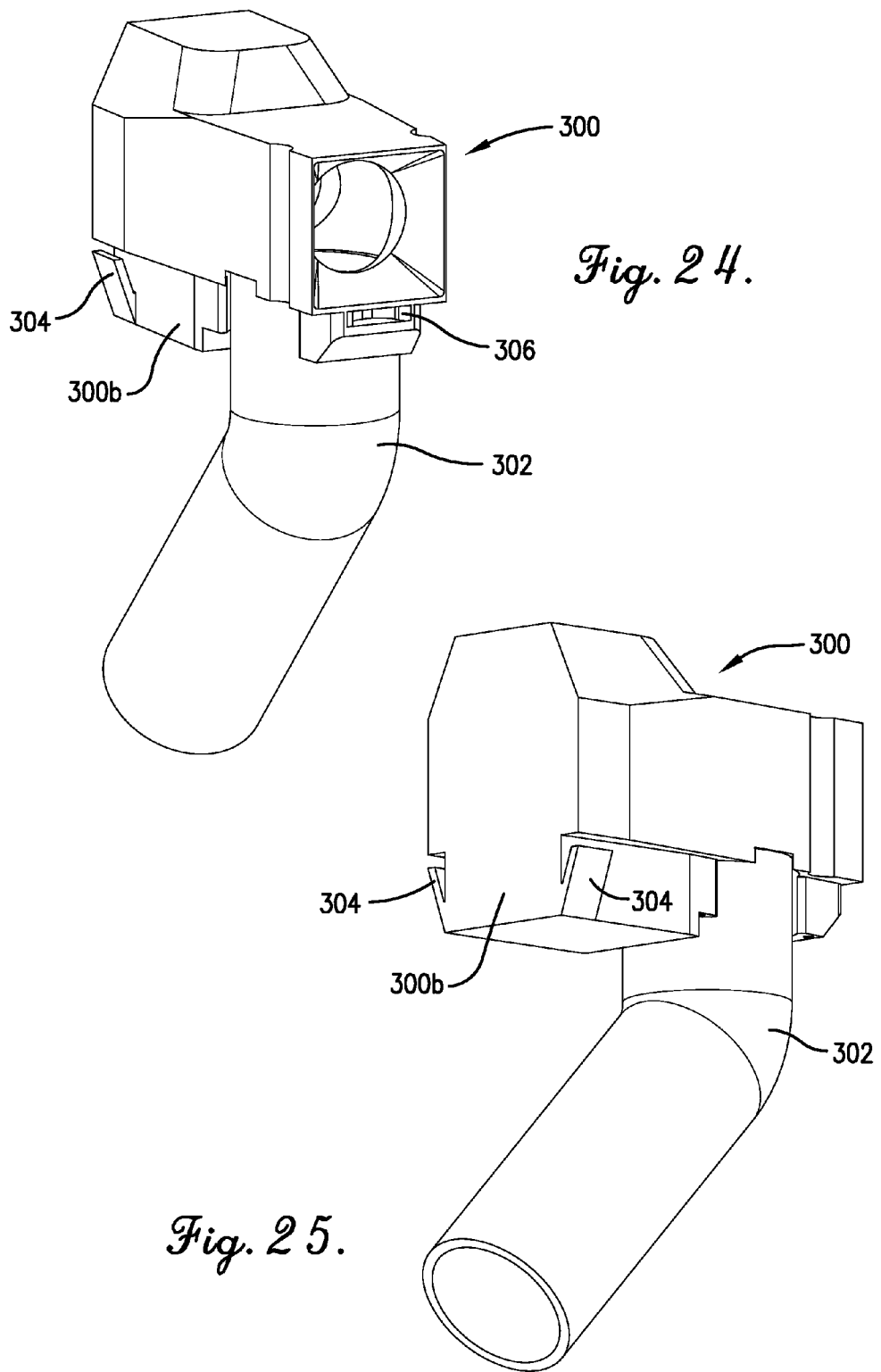

SEED DISTRIBUTION TOWER WITH MODULAR COMPONENTS

TECHNICAL FIELD

The present invention relates to seed distribution towers of the type used on air seeders to split a primary stream of air and seeds from a single source of supply into a plurality of secondary streams for conveyance to a corresponding plurality of separate openers that deposit the seeds into the ground as the seeder advances. More particularly, in some aspects it relates to improvements in a tower as disclosed and claimed in prior co-pending U.S. patent application Ser. No. 13/157,890, titled "Seed Distribution Tower for an Air Seeder", and assigned to the assignee of the present invention. In other aspects it relates to modular construction concepts for a seed distribution tower that are not necessarily limited to use with the concepts disclosed in the '890 application.

BACKGROUND AND SUMMARY

The tower as disclosed and claimed in the above-noted '890 application has seed flow sensors for the secondary streams of air and seeds that are located at the distribution head of the tower, preferably within the head itself. Likewise, the tower of that application can be adapted for use in tram line farming practices wherein one or more of the hoses carrying secondary streams to the openers can be selectively shut off so that no seeds are planted for that particular row. As in the case of the sensors, a valve for the tram line hose is located at, and preferably within, the distribution head. In addition, a special housing immediately below the distribution head encloses and protects delicate wiring and sensitive connectors associated with the various sensors and valves of the tower.

A tower in accordance with the principles of the present invention carries forward with, and in some instances further refines, the above-noted aspects of the '890 application. In addition, a tower in accordance with the principles of the present invention introduces a simplified, modular construction for the distribution head wherein discharge outlets for the secondary streams are presented by individual outlet modules that can be quickly and easily installed and removed from the distribution head on an individual basis. There is no need to disassemble the entire distribution head in order to replace a single outlet module. Among other things, this design facilitates manufacture, makes it easy for the farmer to remove, replace, and exchange individual modules, permits significant flexibility as to which, if any, of the discharge outlets will be devoted to a tram line, and provides the farmer with many choices as to which modules to install for carrying out different functions. The outlet modules may take a variety of different forms and carry out a variety of different functions in addition to their primary functions of serving as a means of directing secondary streams of seeds and air from the distribution tower. They need not include any flow sensors or shut-off valves at all.

In a preferred form of the invention a flow sensor for each secondary hose is incorporated into the outlet module itself so that the sensor forms a part of the distribution head. Likewise, at least certain of the outlet modules may have a shut-off valve incorporated into the body of the module so that the distribution head can be easily adapted for shutting off one or more of the secondary hoses by simply installing the appropriate valve-equipped module(s). An electrically operated motor can be provided for each valve as part of the module, and such motor can be selectively detached from the valve to permit manual valve actuation if desired.

The outlet modules are designed to be installed and removed without the use of tools. In a preferred embodiment a latch for releasably retaining a module in its seat within the distribution head includes a spring-loaded barb on the body of the module that cooperates with structure adjacent the seat to hold the module in place. By manually depressing the barb to a releasing position, the module may be easily withdrawn from the seat.

BRIEF DESCRIPTION OF THE DRAWINGS

FIG. 24 is an inboard end perspective view of an exemplary third embodiment of outlet module of a type having a downward discharge of the secondary stream; and FIG. 25 is an outboard end perspective view of the third embodiment of outlet module of FIG. 24.

DETAILED DESCRIPTION

The present invention is susceptible of embodiment in many different forms. While the drawings illustrate, and the specification describes, certain specific embodiments of the invention, it is to be understood that such disclosure is by way of example only. The principles of the present invention are not limited to the particular disclosed embodiments.

Figure 1:
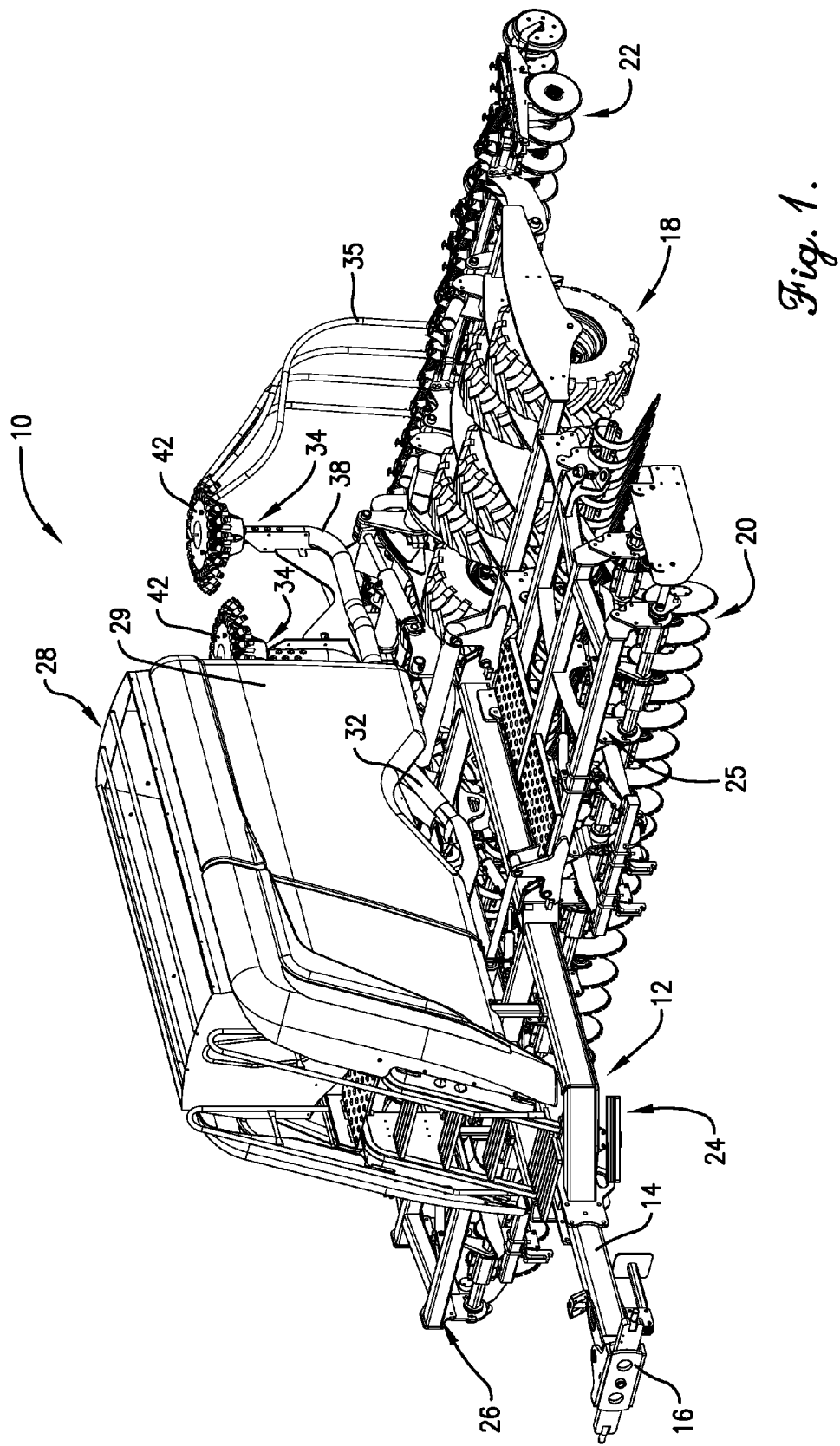
FIG. 1 is a left, front perspective view of a cultivation air seeder utilizing seed distribution towers in accordance with the principles of the present invention.
Figure 2:
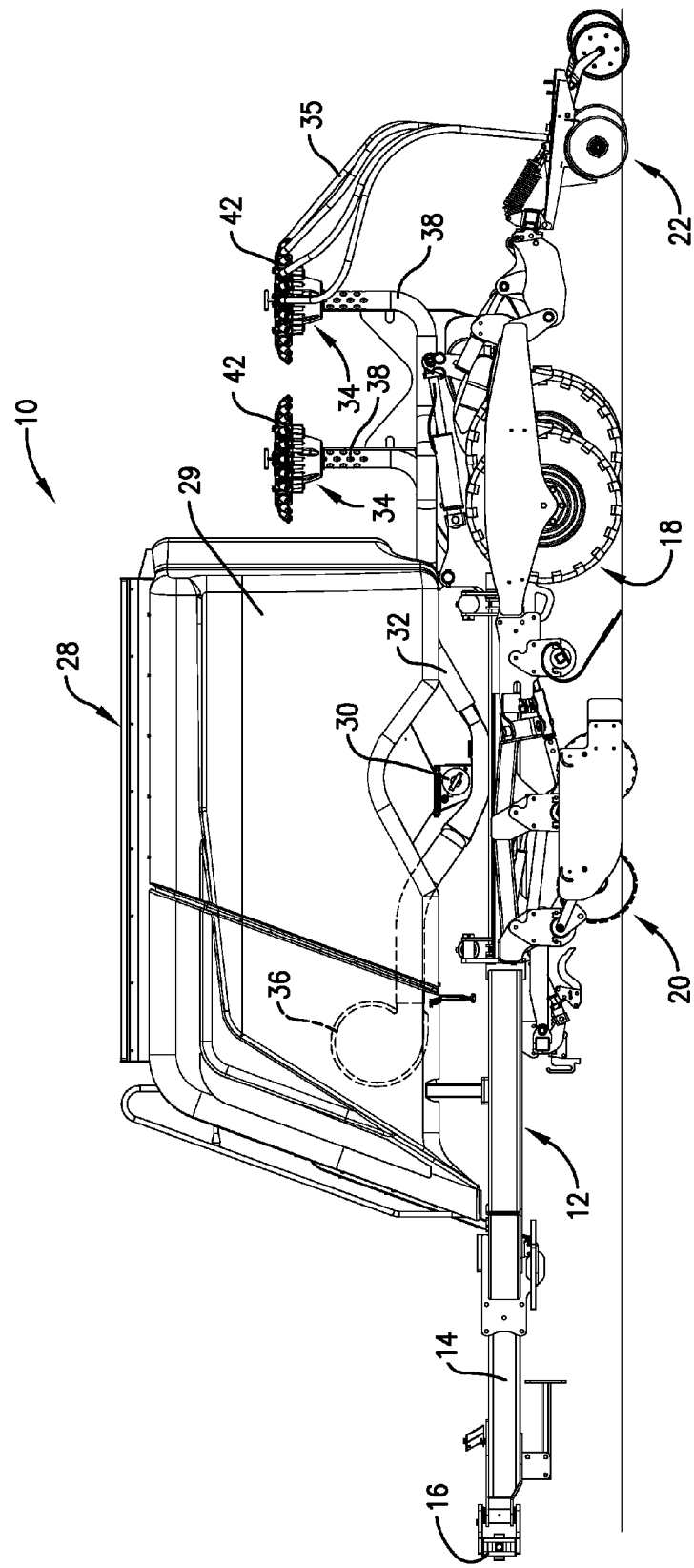
FIG. 2 is a left side elevational view of the seeder.

With initial reference to FIGS. 1 and 2, an exemplary air seeder that may incorporate a seed distribution tower in accordance with the present invention is broadly denoted by the numeral 10 and is provided with a mobile chassis or frame 12 having a tongue 14 and hitch structure 16 for connecting seeder 10 to a suitable towing tractor or other vehicle (not shown). A number of ground-engaging wheels 18 are disposed across the rear of frame 12 to support the frame for over-the-ground travel. In the exemplary disclosed embodiment, seeder 10 comprises a cultivation air seeder and is thus provided with a set of cultivation tools 20 on frame 12 ahead of wheels 18. It will be appreciated, however, that the principles of the present invention may be readily employed on many different types of air seeders and are not limited to use with a cultivation air seeder. A row of openers 22 of any suitable construction well known to those skilled in the art is supported across the rear of frame 12 behind wheels 18. In the illustrated embodiment, seeder 10 comprises a three-section machine, such that frame 12 has a main frame section 24 and pair of left and right wing frame sections 25, 26 respectively, although the number of frame sections is not of importance insofar as the principles of the present invention are concerned. When applied to various parts of the machine, the terms "left" and "right" are utilized as if the machine were being viewed from the rear, looking forwardly.

Seeder 10 further comprises a hopper 28 supported on main frame section 24 for holding a supply of seeds and/or fertilizer or other particulate materials to be distributed to openers 22. Although the illustrated embodiment of the invention will be described in connection with the holding and distribution of seeds by hopper 28, it will be appreciated that the principles of the present invention are not limited to seeds and may, in fact, be utilized in connection with many different kinds of particulate materials.

A meter 30 at the bottom of hopper 28 may be utilized to dispense seeds at a metered rate into one or more conduits 32 that transport the metered seeds within an airstream toward the rear of the machine. One or more distribution towers 34 in accordance with the present invention are coupled with conduits 32 downstream from meter 30 for the purpose of dividing each primary stream of air and seeds into a multiplicity of secondary streams that flow to the openers 22 through hoses 35 (only a limited number being shown in the interest of clarity). A blower 36 adjacent the lower front end of hopper 28 supplies the transporting air for conduits 32 and the secondary hoses 35.

Hopper 28 may be constructed in a variety of different shapes and sizes, and from a variety of different materials. In the illustrated embodiment, hopper 28 is constructed from sheet metal and is covered on three sides by an ornamental facing 29 of molded ABS plastic or the like, which is the subject of prior co-pending application Ser. No. 13/157,856 titled "Cultivation Air Seeder With Visually Enhanced Seed Hopper", assigned to the assignee of the present invention.

Figure 3:
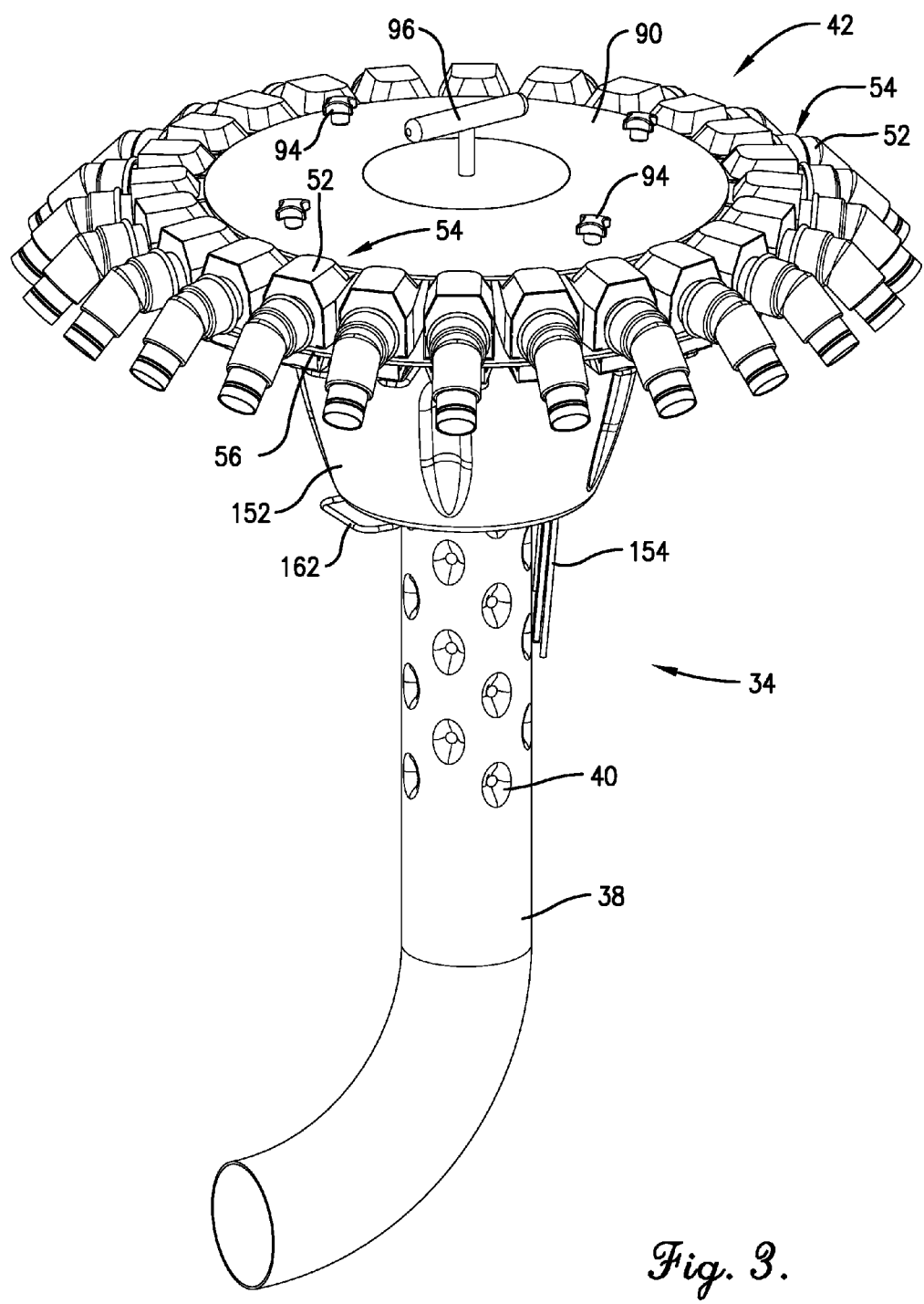
FIG. 3 is an enlarged left front perspective view of one of the distribution towers of the seeder with the secondary distribution hoses removed for clarity.

Each of the towers 34 includes an upright pipe or conduit 38 fixed to frame 12 and connected at its lower end to the conduit 32 from hopper 28. Conduit 38 may be provided with a multitude of exterior dimples 40 (FIGS. 3 and 7 for example) that form corresponding interior projections disposed to be impinged by seeds in the moving primary stream to aid in scattering the seeds as they approach the upper end of conduit 38. A generally flat, circular distribution head 42 is secured to the upper end of conduit 38 for splitting the primary stream into the secondary streams and transitioning the direction of seed flow from generally vertical to generally horizontal.

Figure 6:
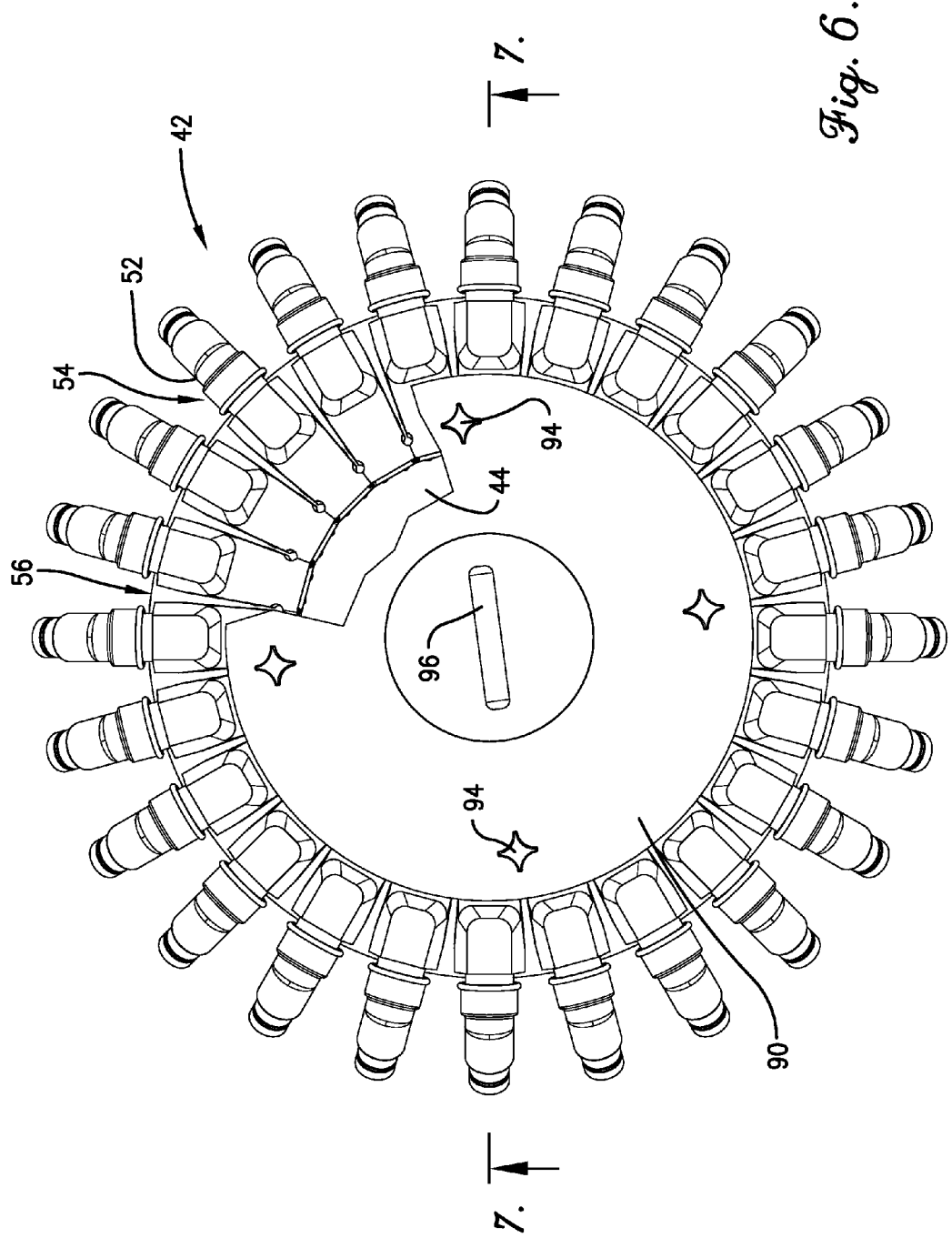
FIG. 6 is a top plan view of the tower with a portion of the distribution head broken away to reveal internal details of construction, including the plenum.

Broadly speaking, each distribution head 42 has an internal plenum chamber 44 (FIGS. 6, 7 and 8) that receives the primary stream of air and seeds from the open top end of conduit 38 through a centrally disposed inlet 46 located in a floor 48 of plenum 44. A top wall 50 of plenum is spaced above floor 48 and carries a centrally disposed, inverted transition cone 52 for causing the incoming primary stream of air and seeds to effectually transition from vertical to horizontal and split into a plurality of secondary streams that issue from distribution head 42 via a corresponding number of discharge outlets 52 arranged circularly about the central upright axis of tower 34. Discharge outlets 52 are connected to the secondary hoses 35 that lead to openers 22.

In accordance with the present invention, each of the discharge outlets 52 may take the form of an outlet module 54 that is independently installed on and removable from the tower 34 in a quick and easy manner. To this end, as particularly shown in FIGS. 5 and 15-20, distribution head 42 includes a generally flat, annular support plate 56 that is fixedly secured to a mounting flange 58 on the upper end of conduit 38 in any suitable manner such as by a series of screws 60. Support plate 56 has a central hole 62 defining the inlet 46 into plenum 44 and a plurality of specially configured seat openings 64 arranged in a circular series concentrically about hole 62. Seat openings 64 are spaced radially outwardly from hole 62 to present an annular web surface 66 between hole 62 and seat openings 64 that defines the floor 48 of plenum 44. The region of web surface 66 directly above flange 58 is horizontal, while the remainder of support plate 56 slopes slightly downwardly and outwardly to a radially outermost, circumferential, solid narrow margin 68 (FIGS. 5, 7 and 15-20) immediately outboard of the seat openings 64.

As illustrated particularly in FIGS. 5 and 15-20, each seat opening 64 is generally rectangular and elongated in overall configuration, having a length in a radial direction that is somewhat greater than its width in a circumferential direction. Seat opening 64 has a pair of opposite side edges 70, a radially innermost end edge 72, and a radially outermost end edge 74. Innermost end edge 72 is shaped to present a radially outwardly projecting tab 76, while outermost edge 74 is straight and extends in perpendicular relationship to the radially extending, longitudinal axis of seat opening 64. The outermost end of seat opening 64 has a somewhat T-headed configuration, presenting a pair of oppositely laterally extending, enlarged notches 78. The inboard halves of side edges 70 taper toward one another as innermost end edge 72 is approached, while the outboard halves of side edges 70 extend parallel to one another out to the notches 78.

Each outlet module 54 has an overall generally block-like configuration. As illustrated particularly in FIGS. 11-21, module 54 has an upper portion or half 54a that is slightly wider than its lower portion or half 54b so as to present an overhanging, downwardly facing shoulder 54c along both sides of module 54 at the intersection of upper half 54a and lower half 54b. Lower half 54b is configured to be complementally received within seat opening 64 when module 54 is seated on support plate 56, but upper half 54a is slightly wider than seat opening 64 such that overhanging shoulders 54c overlie and abut top surfaces of plate 56 adjacent seat opening 64 at that time, thus preventing module 54 from slipping completely downwardly through seat opening 64. A recess 80 in the inboard end of lower half 54b is adapted to complementally receive tab 76 for locating and retaining purposes when module 54 is received in seat opening 64, and a pair of spring-loaded, resilient barbs 82 on opposite sides of lower half 54b adjacent the outboard end of module 54 are complementally shaped with respect to notches 78. Barbs 82 comprise a releasable latch 84 for securing module 54 to support plate 56 and present free upper ends that flare outwardly in their normal unrestrained state to a combined width that exceeds the width dimension of seat opening 64 across notches 78. On the other hand, barbs 82 may be resiliently squeezed together at their upper ends to present a reduced combined width matching or less than the dimension across notches 78 to permit barbs 82 to pass through seat opening 64 during installation and removal of module 54. The upper ends of barbs 82 are spaced below shoulder 54c a sufficient distance as to permit plate 56 to be trapped between the upper ends of barbs 82 and shoulder 54c when module 54 is fully seated in opening 64, thereby latching module 54 in place.

Each outlet module 54 has a rectangular (preferably square) inboard inlet end 86 that communicates with plenum 44 and receives air and seeds therefrom. When all of the modules 54 are in place in the seat openings 64, the inlet ends 86 of adjacent modules 54 abut one another in a lateral sense (see FIGS. 6 and 8) to effectively form a circle that defines a radially outer wall of plenum 44. The interengagement of inlet ends 86 with one another effectively seals those interfaces against the escape of air and seeds, leaving travel through the interior of the outlet modules 54 as the only means of exiting plenum 44. Inlet ends 86 of modules 54 are lined up along the radially outer extremity of web surface 66 of plate 56, as particularly shown in FIGS. 6 and 8.

Each module 54 has a flat top surface 88 that cooperates with the top surfaces of the other modules 54 in the circle to present an annular shelf that supports a circular, slightly domed lid 90 of distribution head 42. Lid 90 has transition cone 51 secured to the underside thereof and forms the top wall 50 of plenum 44. Four upright bolts 92 (FIGS. 5, 8) at 90E intervals about support plate 56 pass upwardly through lid 90 and threadably receive nutted hand knobs 94 for releasably securing lid 90 in place. A T-shaped handle 96 is attached to the center of lid 90 to facilitate handling thereof, the handle 96 also serving to threadably secure transition cone 51 to the underside of lid 90. When lid 90 is secured down tightly against outlet modules 54, it effectively retains modules 54 in place on the tower. Thus, although notches 78 and locating tabs 76 are preferred in addition to lid 90 for retaining modules 54 in place, notches 78 and tabs 76 are not necessarily required.

Figure 9:
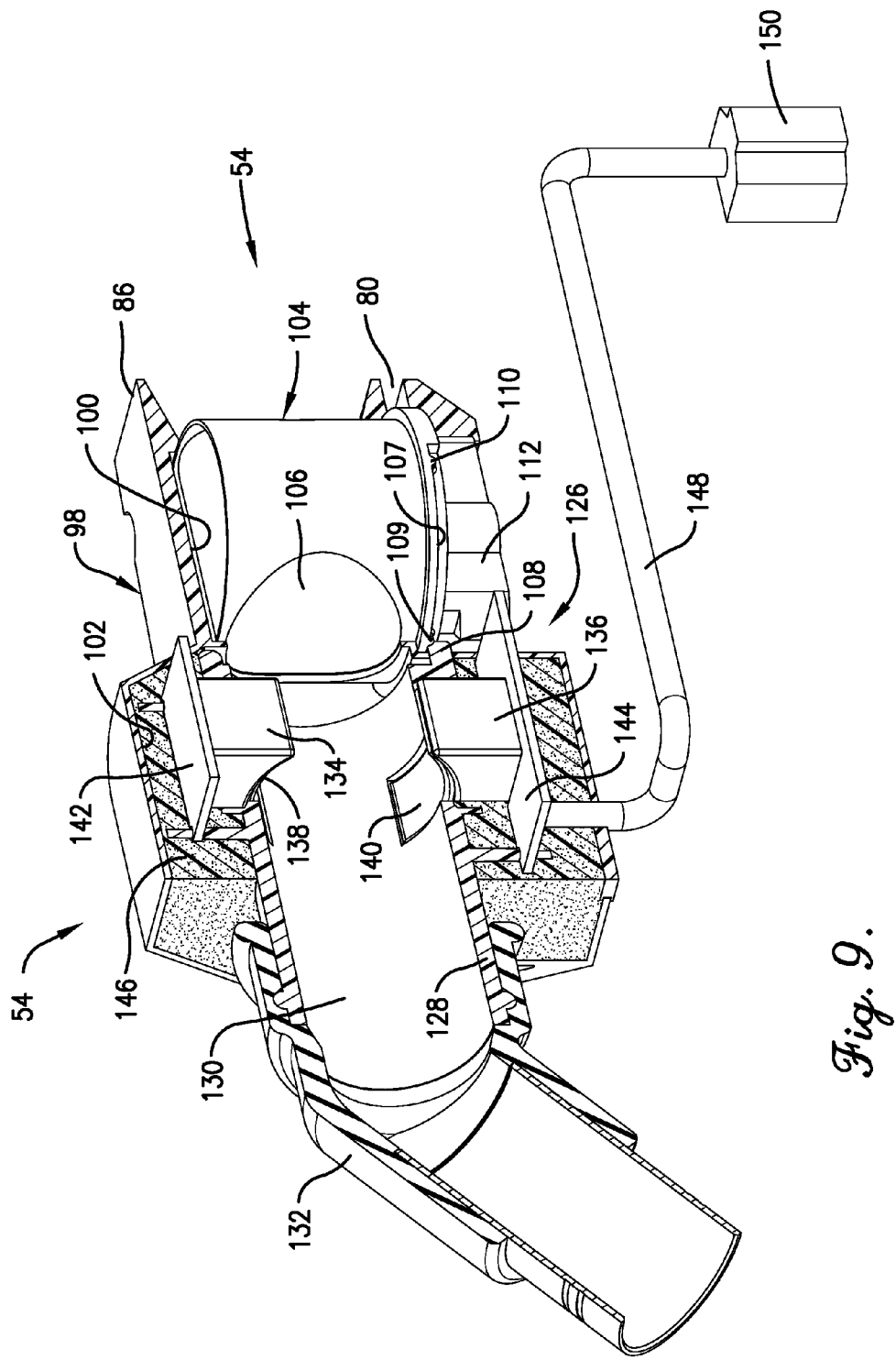
FIG. 9 is an enlarged, cross-sectional perspective view of one embodiment of an outlet module of the tower, the shut-off valve of the module being shown in an open position.
Figure 10:
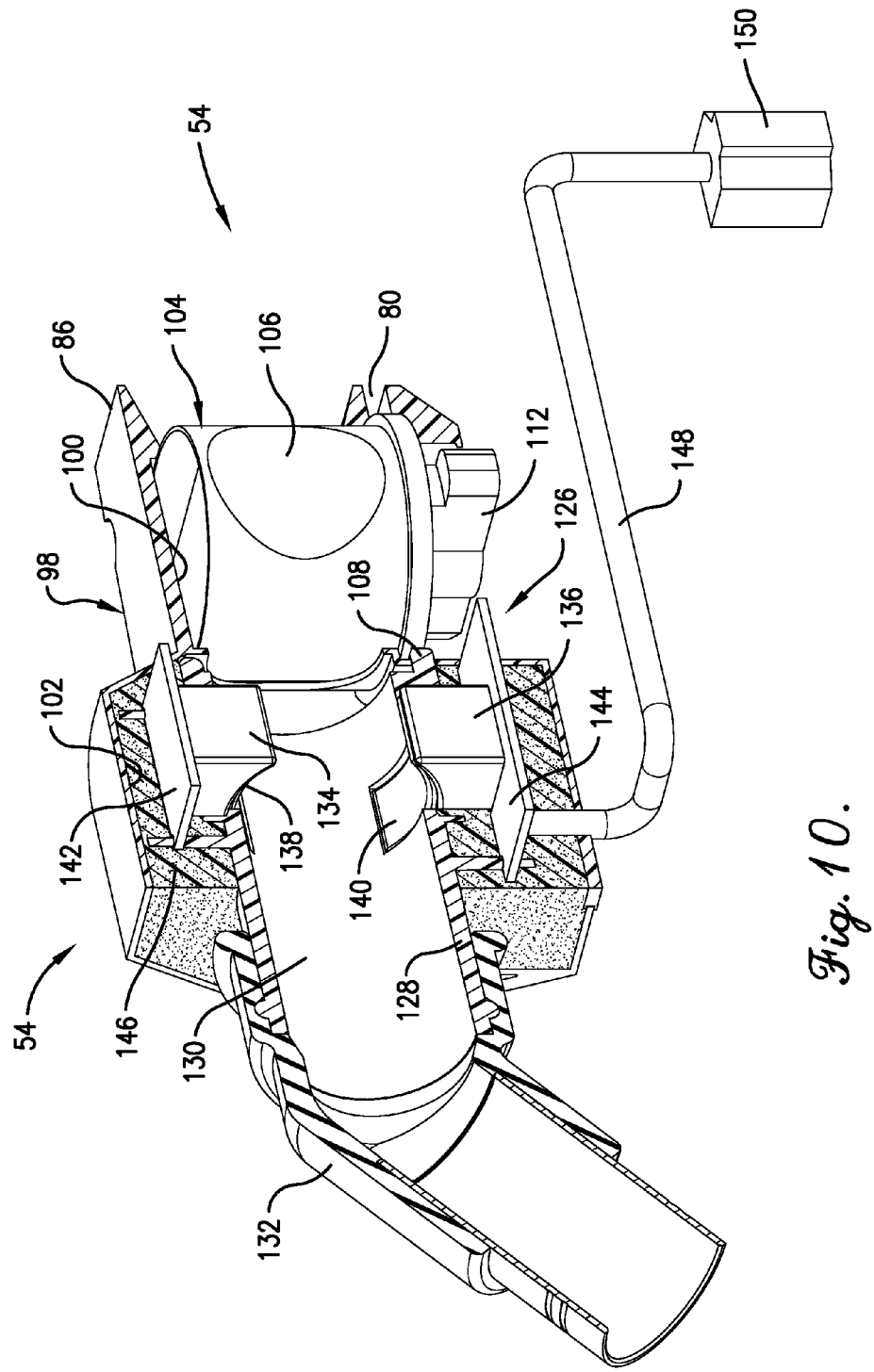
FIG. 10 is an enlarged, cross-sectional perspective view of the module of FIG. 9 with the shut-off valve shown in a closed position.
Figure 11:
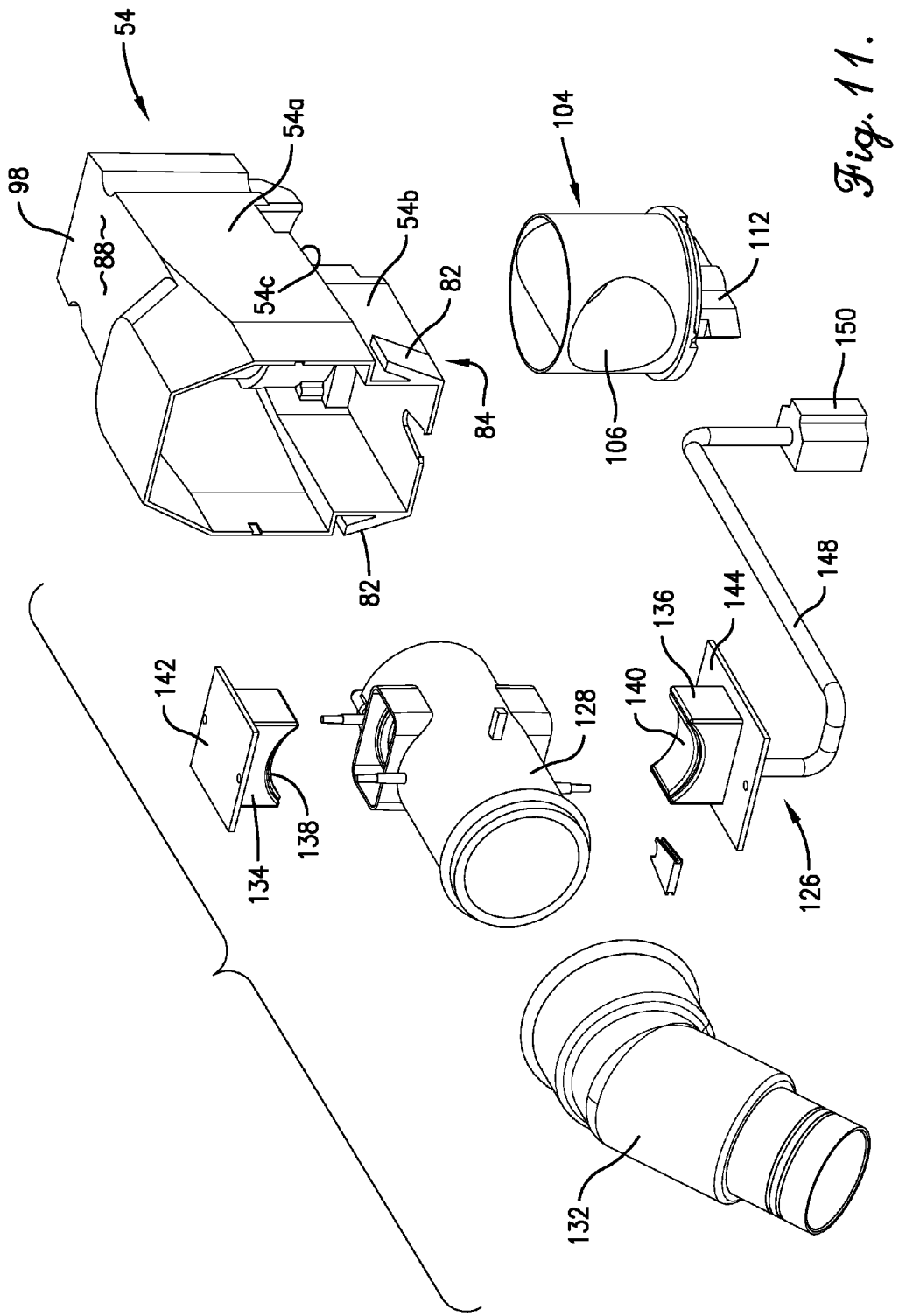
FIG. 11 is an exploded top perspective view of the module of FIG. 9.
Figure 12:
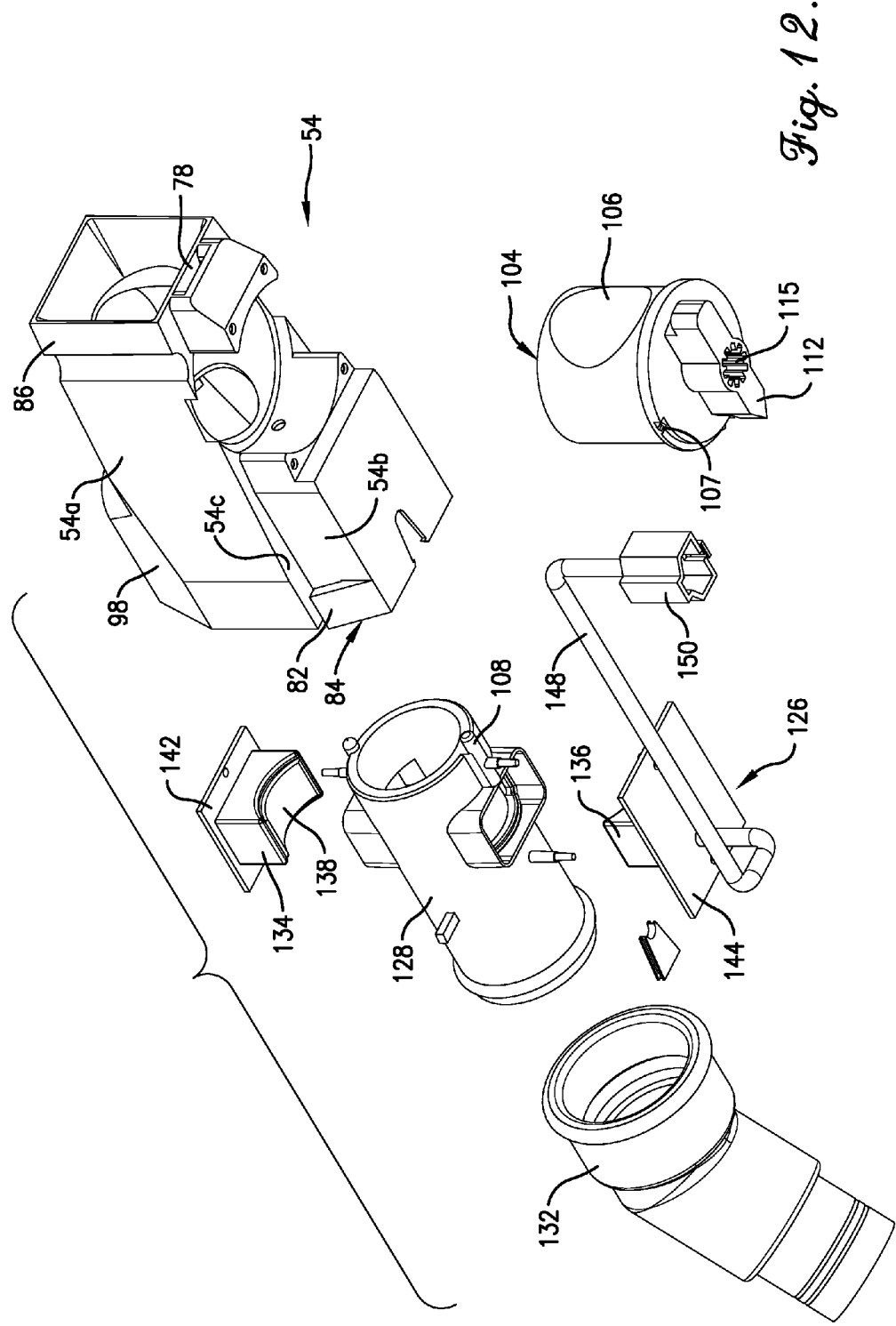
FIG. 12 is an exploded bottom perspective view of the module of FIG. 9.
Figure 13:
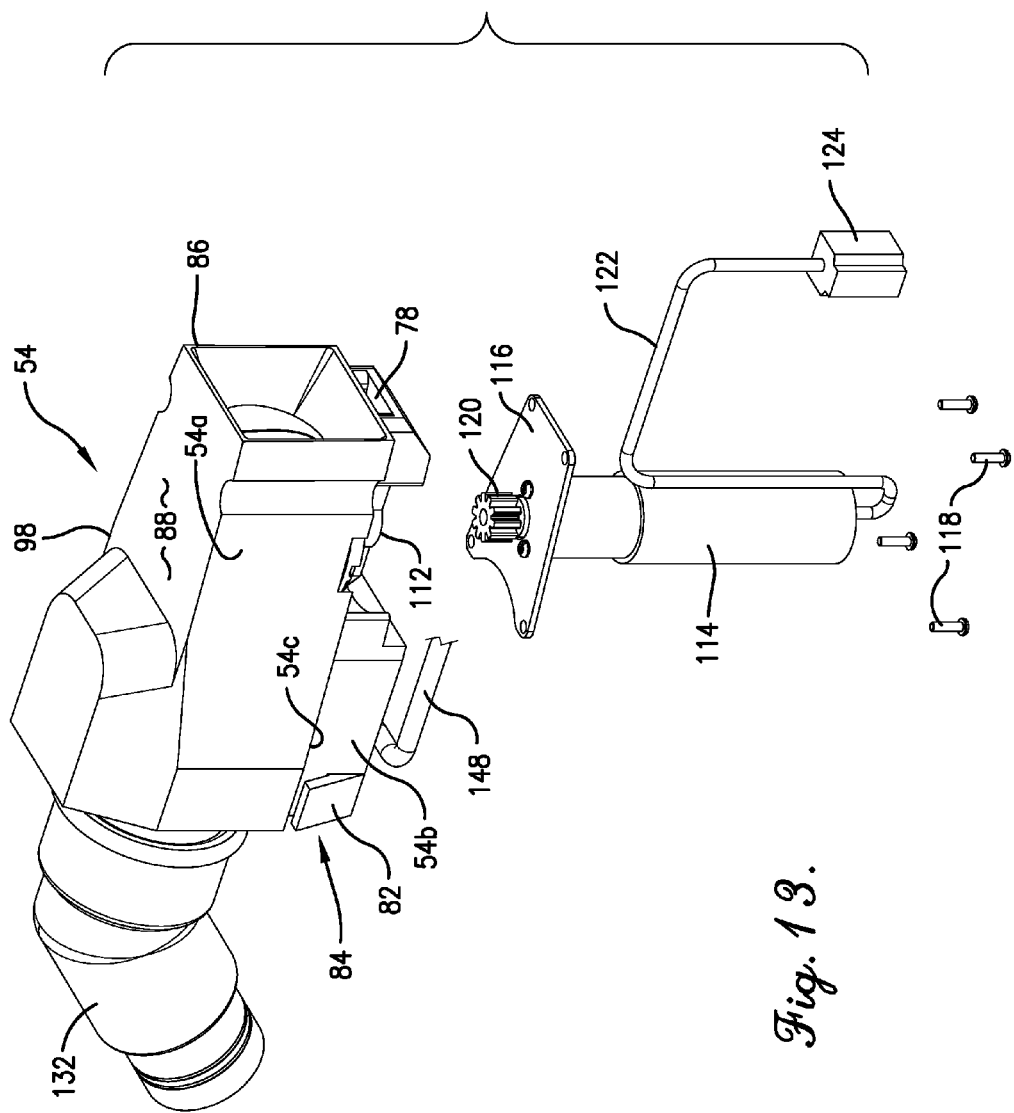
FIG. 13 is a side perspective view of the module of FIG. 9 showing the manner in which the valve actuating motor may be detached from the valve.
Figure 14:
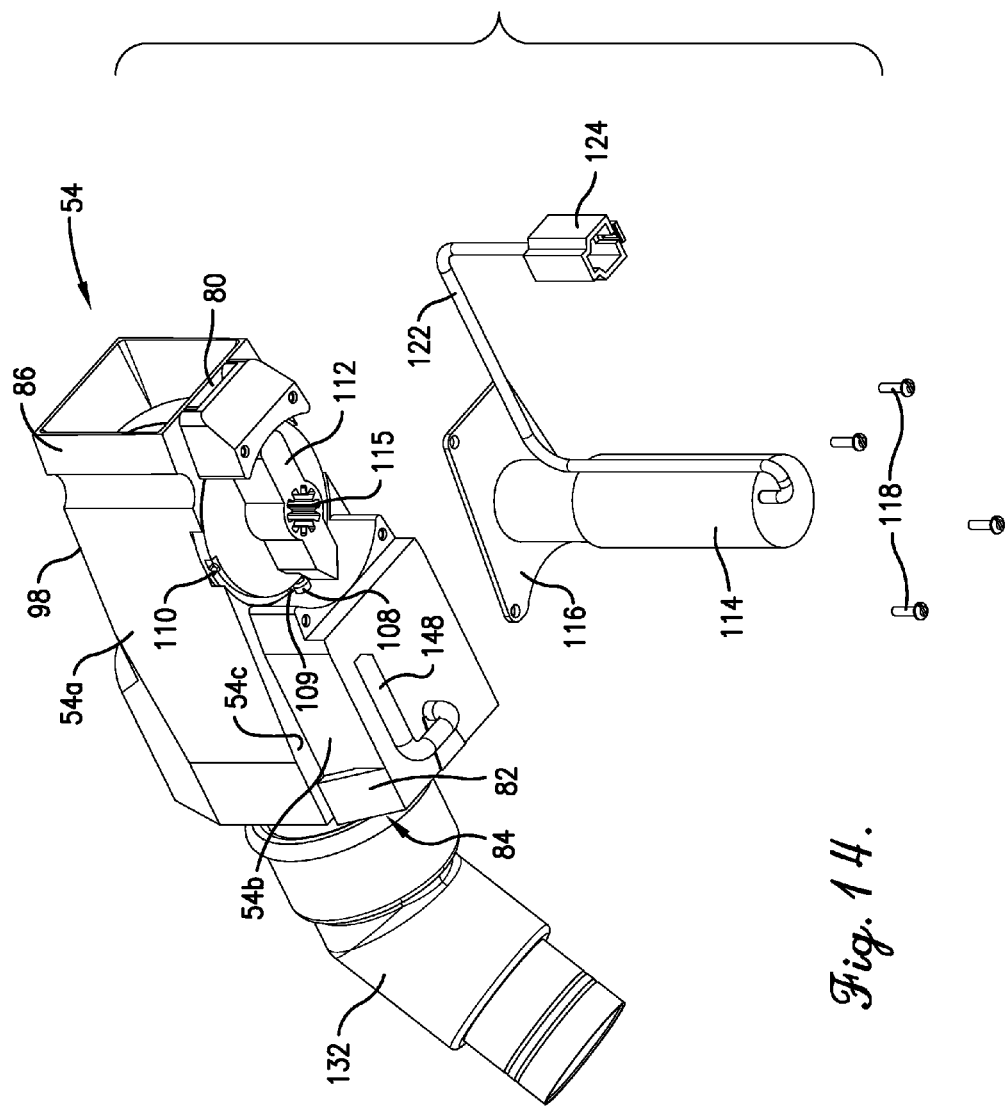
FIG. 14 is a bottom perspective view of the module of FIG. 9 showing the manner in which the valve actuating motor may be detached from the valve.

As detailed in FIGS. 9-14, each module 54 comprises a tubular body that includes a housing 98 containing a valve chamber 100 generally adjacent inlet end 86 and a sensor chamber 102 generally adjacent the opposite end of module 54. An upright, cylindrical plug valve 104 is rotatably housed within valve chamber 100 for selective 90E rotation about an upright axis between an open position as illustrated in FIG. 9 and a closed position as illustrated in FIG. 10. A horizontal cylindrical bore 106 defines a passage through valve 104 that communicates with plenum 44 via inlet end 86 when valve 104 is in the open position and blocks such communication when valve 104 is in the closed position. A 90E groove 107 around the bottom of valve 104 provides a track within which is received a fixed peg 108. The opposite ends of groove 107 correspond to the open and closed positions respectively of valve 104, and a pair of downwardly projecting, triangular detents 109 and 110 are provided within groove 107 a short distance from such respective opposite ends of groove 107 to yieldably retain peg 108 at one or the other of the opposite ends of the groove 107. Detents 109, 110 can override peg 108 when valve 104 is rotated with force out of its open or closed position. The detents 109, 110 thus serve to yieldably retain valve 104 in its selected open or closed position. An arrow boss 112 on the bottom of valve 104 is shaped in the nature of an arrow boss to provide immediate visual recognition of whether valve 104 is in the open or closed position, the arrow boss 112 pointing in the outboard direction to indicate the open condition and pointing in a transverse direction to indicate a closed condition.

The arrow boss 112 on the bottom of each valve 104 is adapted to be manually gripped to permit manual turning of valve 104, if desired. Alternatively, mechanical drive is provided for by a splined bore 115 in arrow boss 112 that facilitates the connection of a suitable drive motor or the like to valve 104. In this respect, as illustrated particularly in FIGS. 13 and 14, an electrically energized actuating motor 114 may be removably secured to housing 98 by screws 118 and a mounting plate 116 fixed to motor 114. The output shaft of motor 114 has a spur gear 120 fixed thereto that is adapted to be drivingly received within bore 115 to provide motorized operation of valve 104. A conductor wire 122 for supplying electrical power to motor 114 leads away from motor 114 toward a source of such power. Thus, if the user desires motorized operation of valve 104, he attaches motor 114 to valve 104. If only manual actuation is desired, motor 114 is removed by simply unscrewing mounting plate 116 from housing 98.

Each outlet module 54 further includes a sensor 126 disposed within sensor chamber 102 for detecting the movement or non-movement of seeds through module 54. In the exemplary embodiment, sensor 126 includes a tube 128 having a central passage 130 that communicates with plenum 44 via bore 106 in valve 104 when valve 104 is open. The opposite outboard end of passage 130 communicates with a corresponding secondary hose 35 via an elbow fitting 132 on the outboard end of tube 128.

In the illustrated embodiment, sensor 126 is an optical sensor, although a variety of other types of sensors could be utilized, such, for example, an audio sensor, a pressure sensor, or an impact sensor. As an optical sensor, each sensor 126 includes a pair of photo cells 134, 136 carried by tube 128 in diametrically opposed locations for transmitting a light beam across passage 130. One of the cells is a sender and the other is a receiver. Breaking of the light beam by seeds moving in passage 130 is used to confirm the fact that seeds are indeed being dispensed through the module. A clear lens 138 in the wall of tube 128 covers cell 134, while another clear lens 140 covers cell 136. A pair of circuit boards 142, 144 are embedded within potting material 146 surrounding tube 128 within sensor chamber 102, such circuit boards 142, 144 being electrically connected to the cells 134 and 136 respectively. Suitable boards that may serve as circuit boards 142, 144 are available from DICKEY-john Corporation of Auburn, Ill. as the VIGILENSE brand blockage sensor. An electrical conductor 148 connected to boards 142, 144 has a quick connector 150 at its distal end for connecting sensor 126 with an appropriate control system of the machine.

Figure 4:
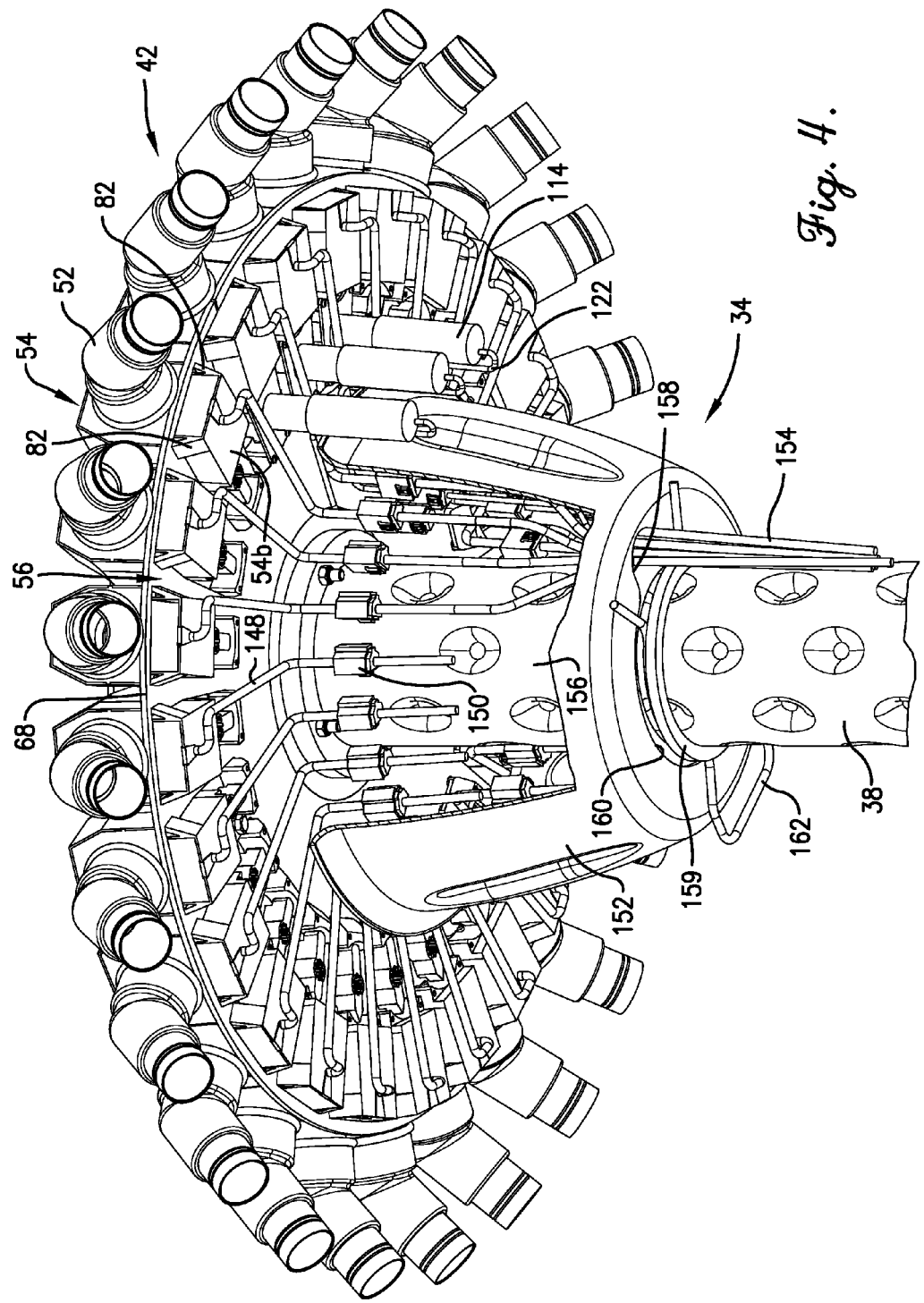
FIG. 4 is an enlarged, fragmentary bottom perspective view of the tower with parts broken away to reveal details of construction.
Figure 5:
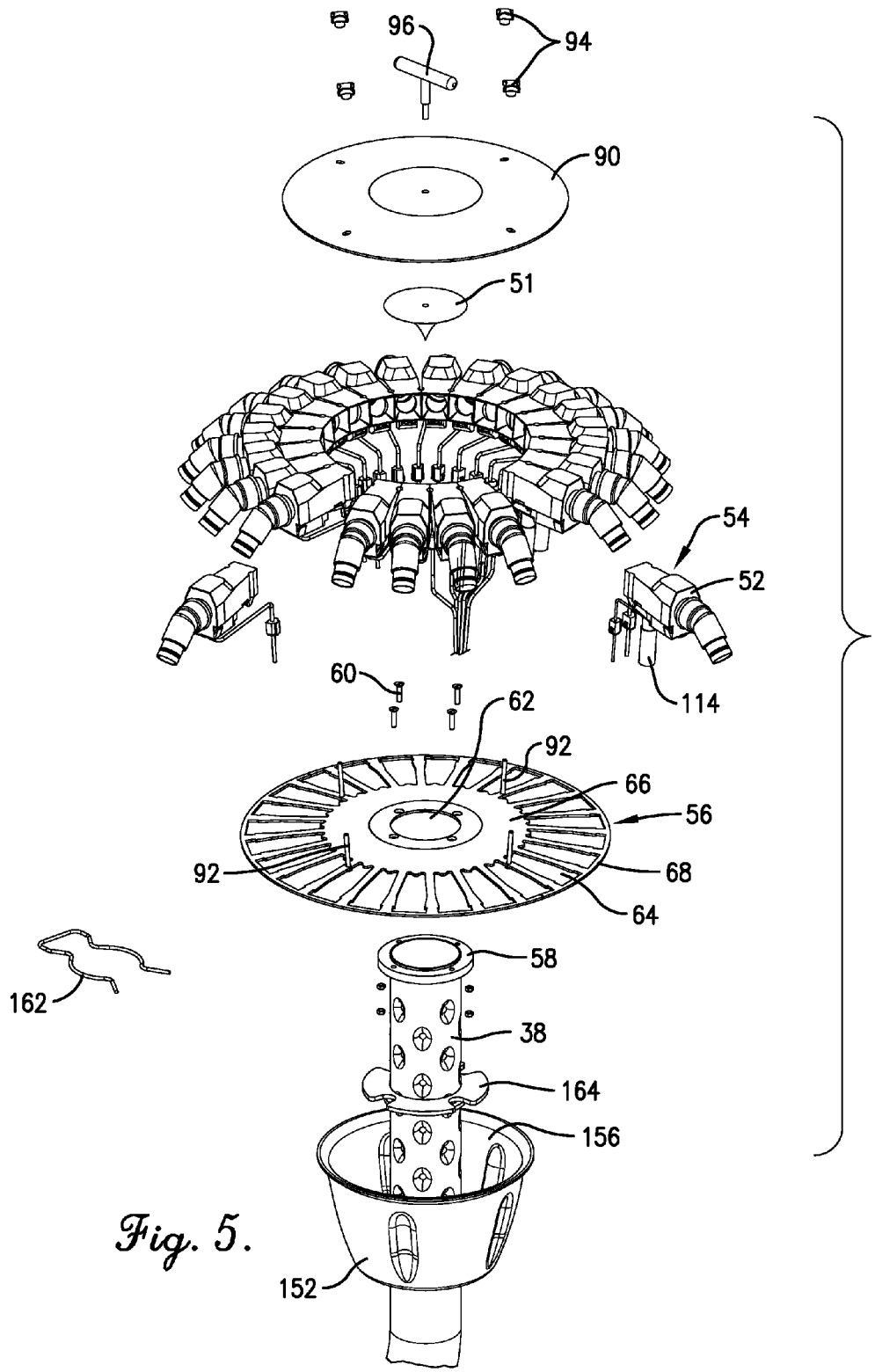
FIG. 5 is a fragmentary exploded view of the tower.
Figure 7:
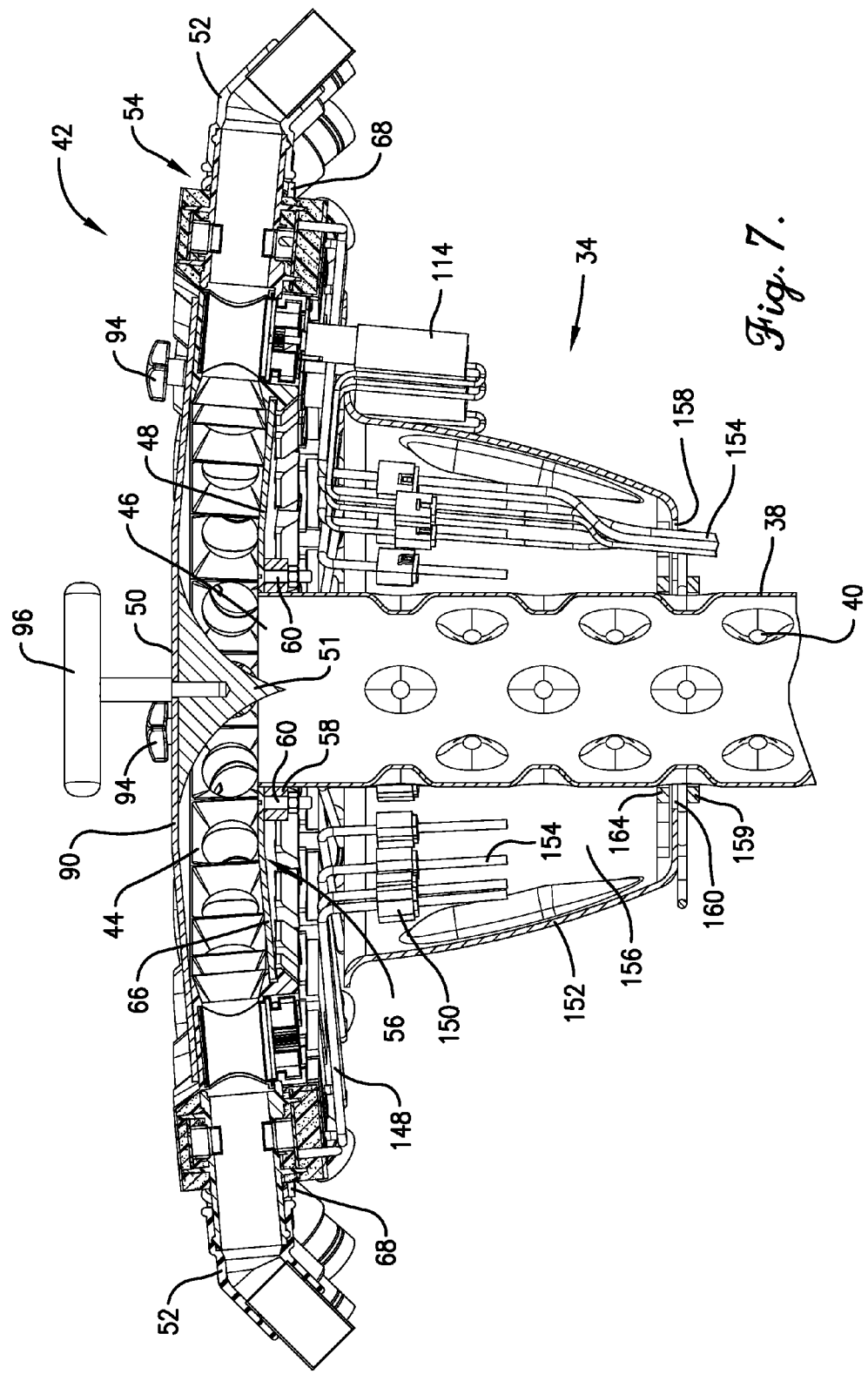
FIG. 7 is a fragmentary vertical cross-sectional view through the tower taken substantially along line 7-7 of FIG. 6.
Figure 8:
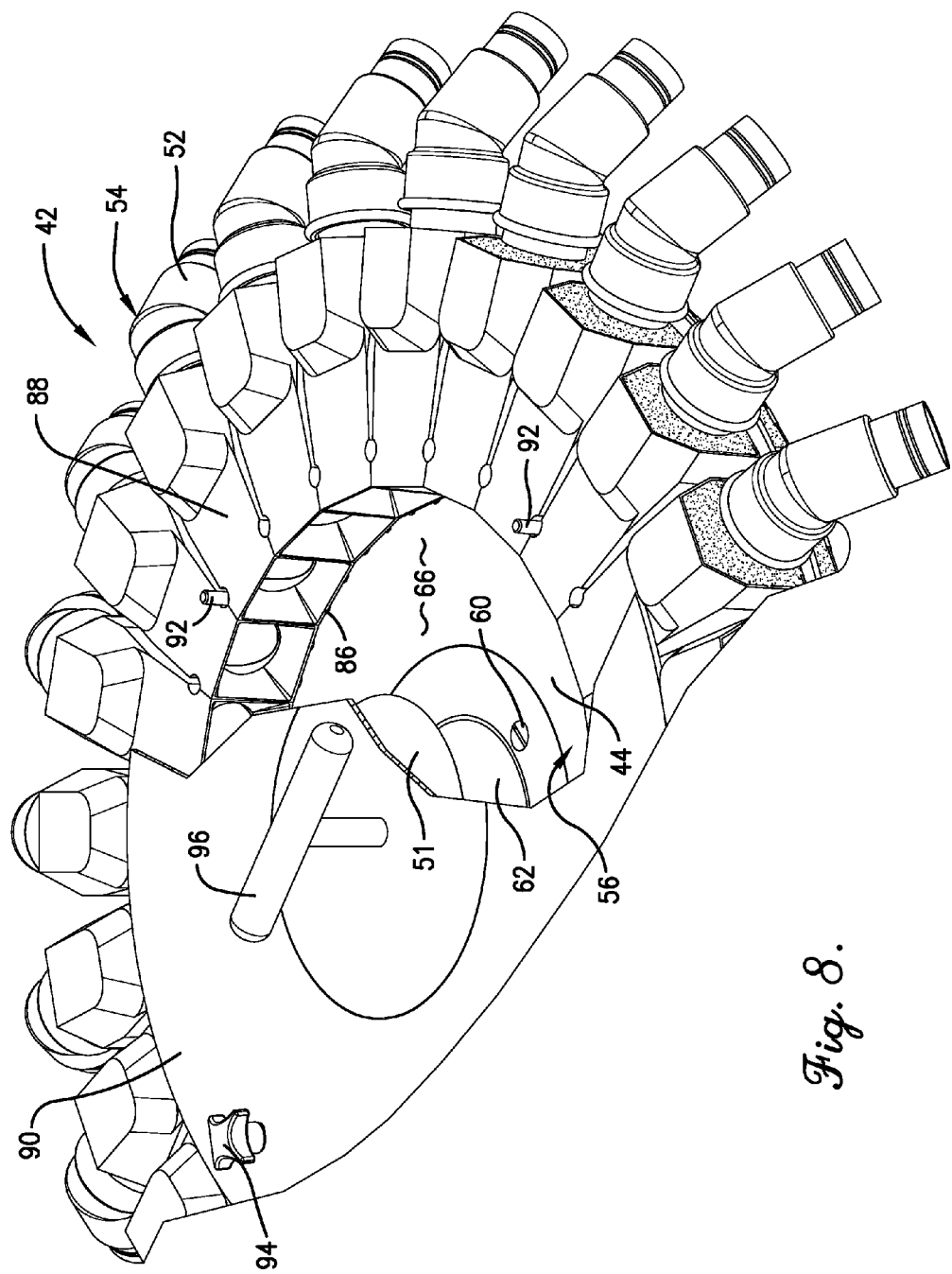
FIG. 8 is a fragmentary top perspective of the distribution head of the tower with the lid partially broken away to reveal internal details of construction, including the plenum.

As seen in FIGS. 4 and 7, the conductors 148 associated with sensors 126 of all of the outlet modules 54 of distribution head 42 exit from the lower halves 54b of modules 54 below support plate 56. They then lead generally radially inwardly from modules 54 toward upright conduit 38 and pass over the upper edge of a bowl-shaped housing 152 that is spaced a short distance below support plate 56. The free ends of sensor conductors 148 having connectors 150 thereon are enclosed within housing 152 where they may be joined with leads 154 from the control system of the seeder. Thus, housing 152 provides a protective compartment 156 within which sensor conductors 148, connectors 150, and leads 154 may be contained. One or more holes 158 may be provided in the bottom of housing 152 through which leads 154 may be trained.

Housing 152 is retained on conduit 38 by any suitable means, such as, for example, a ring 158 (FIGS. 4 and 7) fixed to conduit 38 below a larger diameter opening 160 in the bottom of housing 152 and a removable spring clip 162 that embraces conduit 38 above ring 158 and below the bottom of housing 152. A petal-shaped plate 164 (see also FIG. 5) of larger diameter than opening 160 may be fixed to conduit 38 a short distance above ring 158 to overlie and engage the top side of the housing bottom and serve as an upper limit to housing 152 when it is installed on conduit 38 by lifting it up into place from the bottom end of conduit 38.

Only a few of the outlet modules 54, if any, on each distribution tower 34 are likely to be used as tram lines. Thus, it is within the purview of the present invention for only a few of the outlet modules 54 on each tower 34, or none at all, to be provided with shut-off valves 104. Similarly, even if all of the outlet modules 54 on a particular tower 34 are provided with valves 104, it is within the purview of the present invention to have only a few of them, or none at all, provided with actuating motors 114. The conductors 122 associated with any motors 114 that are utilized on a head 42 may conveniently be trained up and over the upper edge of housing and into the protective compartment 156, where their connectors 124 may be connected with appropriate ones of the leads 154 from the control system of the seeder.

Figure 15:
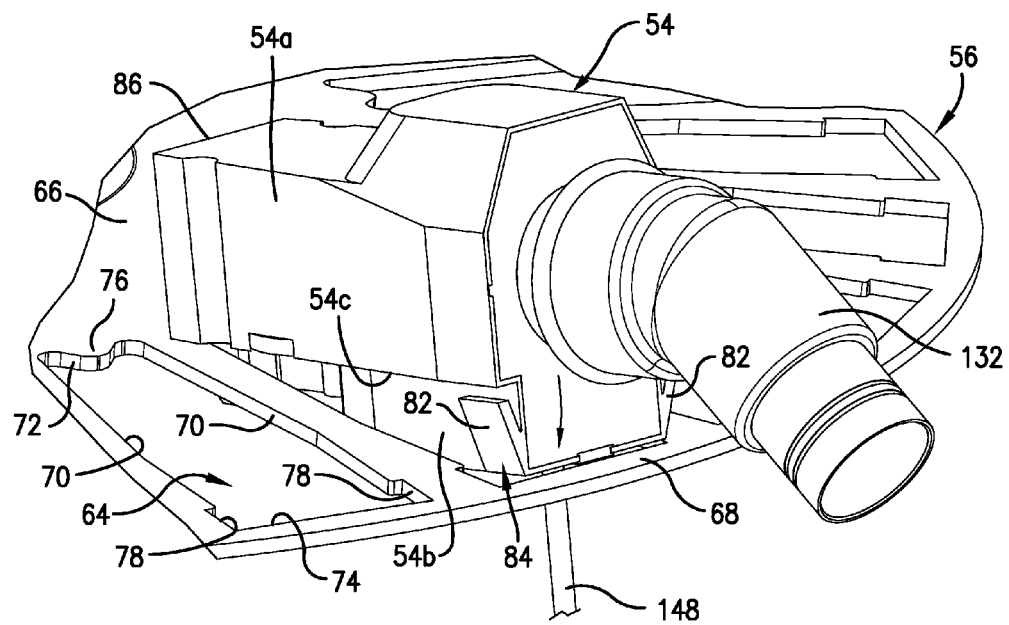
FIG. 15 is a fragmentary perspective view of the distribution head illustrating the manner in which the outlet module of FIG. 9 may be installed into the support plate of the distribution head, the module being shown with its inboard end seated in place and its outboard end positioned to be pushed down into place.
Figure 16:
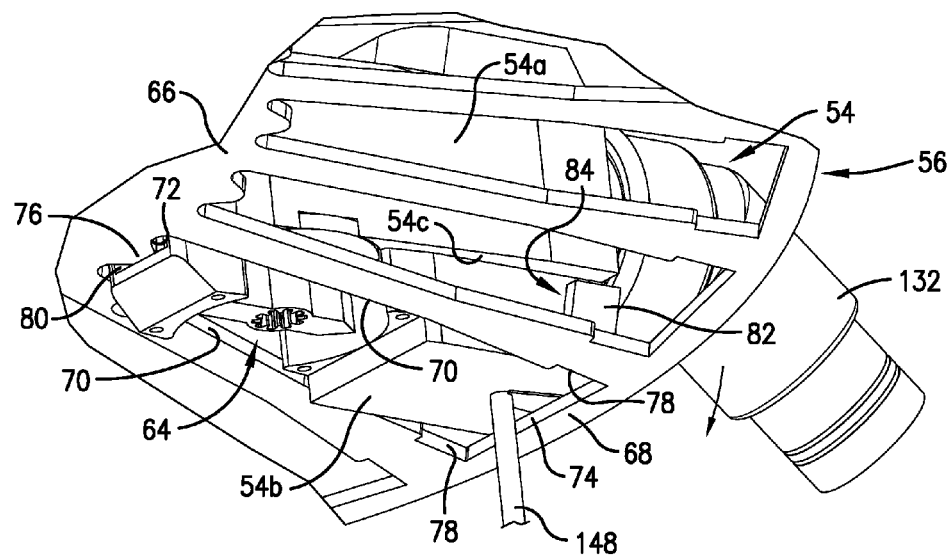
FIG. 16 is a fragmentary bottom perspective view of the module in the partially installed position of FIG. 15.
Figure 17:
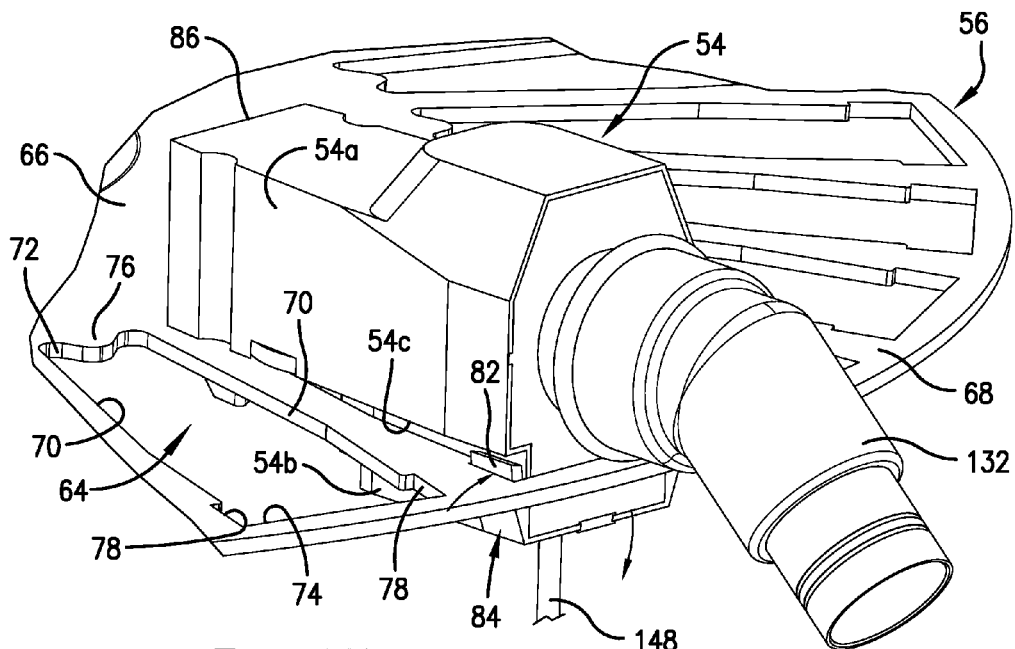
FIG. 17 is a fragmentary perspective view of the partially installed module with its outboard end further seated into the support plate such that retaining barbs on the module are flexed to accommodate such seating movement.
Figure 18:
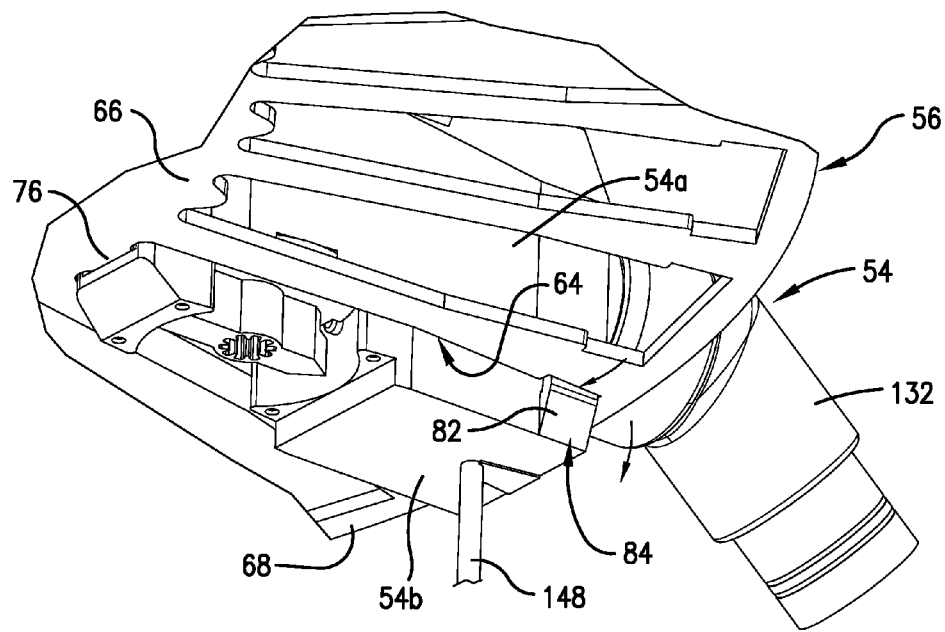
FIG. 18 is a fragmentary bottom perspective view of the partially installed module corresponding to the position of FIG. 17.
Figure 19:
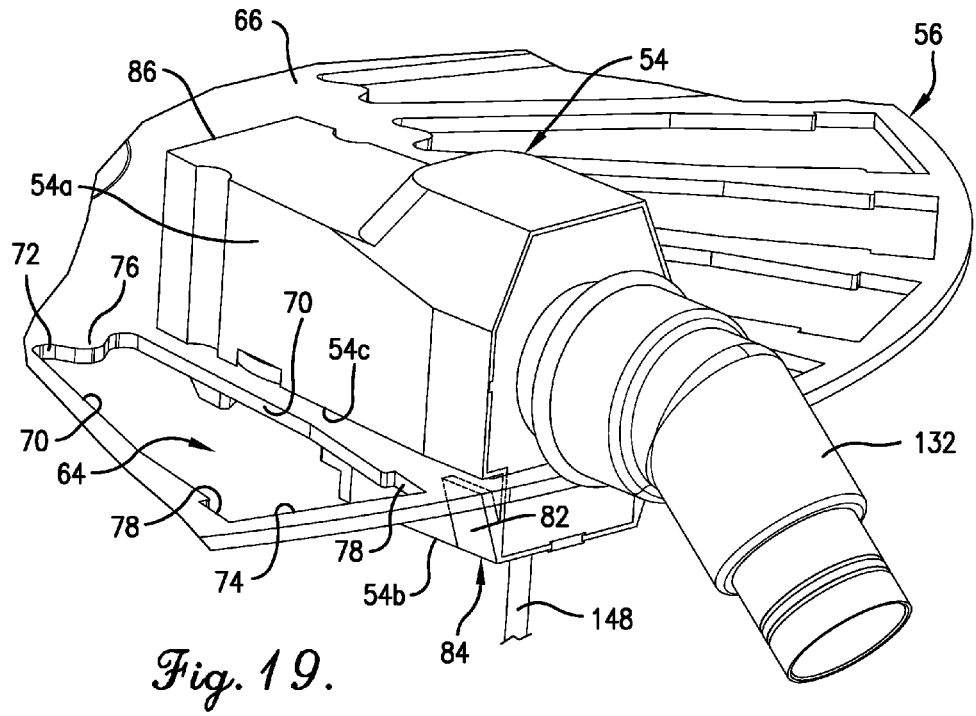
FIG. 19 is a fragmentary perspective view of the module fully installed in its seat.
Figure 20:
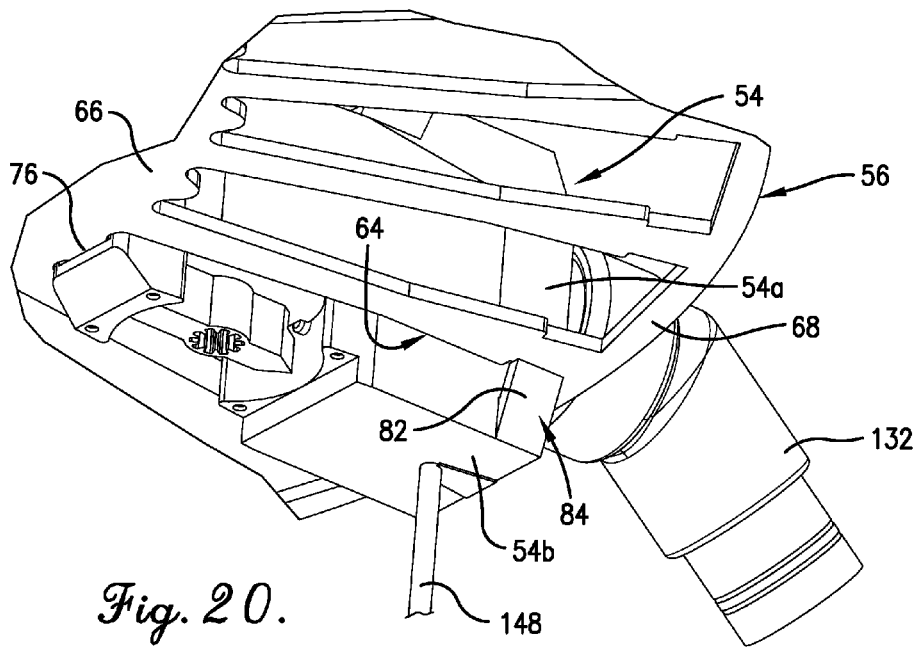
FIG. 20 is a fragmentary bottom perspective view of the fully installed module corresponding to the position of FIG. 19.
Figure 21:
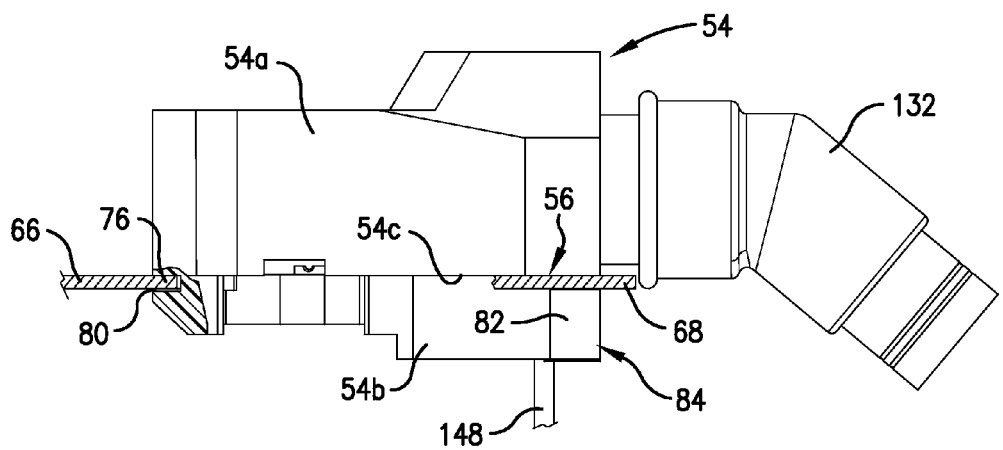
FIG. 21 is a fragmentary side elevational view of the fully installed module corresponding to the position of FIGS. 19 and 20, the adjacent portions of the support plate of the distribution head being shown in cross-section for clarity.

It should be apparent from the foregoing detailed description of the construction of distribution tower 34 that the modular nature of tower 34 permits rapid assembly and disassembly of the tower, as well has quick and easy replacement of individual ones of the outlet modules 54. For example, as illustrated in FIGS. 15-21 installation of a module 54 onto support plate 56 is accomplished by simply properly orienting the module with respect to the selected seat opening 64, inserting the inboard end of the module's bottom half 54b on an incline down into seat opening 64 to cause tab 76 to enter recess 80, and then pushing the outboard end of module 54 downwardly until the module's bottom half 54b snaps securely in place within opening 64. FIGS. 15 and 16 illustrate the start of this sequence wherein tab 76 is received within recess 80 but barbs 82 are up out of opening 64; FIGS. 17 and 18 illustrate the midpoint of the sequence wherein barbs 82 are received within notches 78 of opening 64 and are being flexed inwardly to permit continued downward movement of the module's bottom half 54b into opening 64; and FIGS. 19 and 20 illustrate the module's bottom half 54b fully in place within opening 64 with barbs 82 snapped resiliently back out to their normal positions to underlie adjacent surface areas of support plate 56 so as to latch module 54 against upward movement. FIG. 21 also shows module 54 fully latched in place.

To remove a module from support plate 56, it is only necessary for the user to squeeze barbs 82 toward one another a sufficient extent that their upper ends become aligned with notches 78 and then, while maintaining the barbs 82 squeezed inwardly, thrust the outboard end of the module upwardly to dislodge the module from the seat opening. The dislodged module can then be lifted completely off support plate 56 for service or replacement as may be necessary or desirable.

ALTERNATIVE EMBODIMENTS

It is to be appreciated that the modules which provide outlets 52 for distribution head 42 may embody a variety of different designs and perform different and/or additional functions. Yet, all are provided with those common features that render the outlet truly modular in nature.

Figure 22:
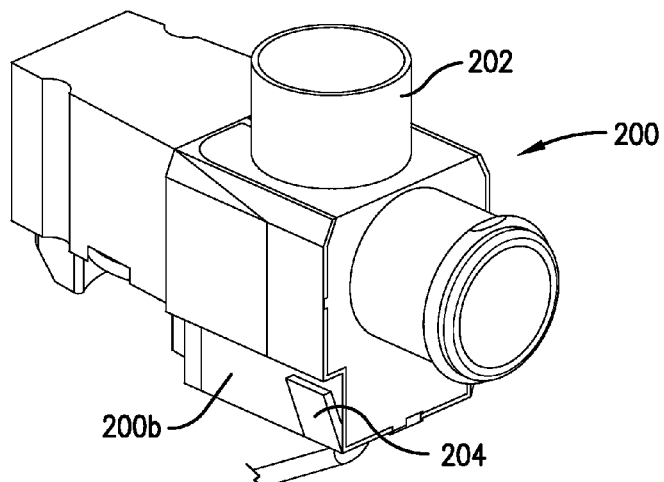
FIG. 22 is an outboard end perspective view of an exemplary second embodiment of outlet module of a type adapted to receive and introduce an additional product into the secondary stream passing through the module.
Figure 23:
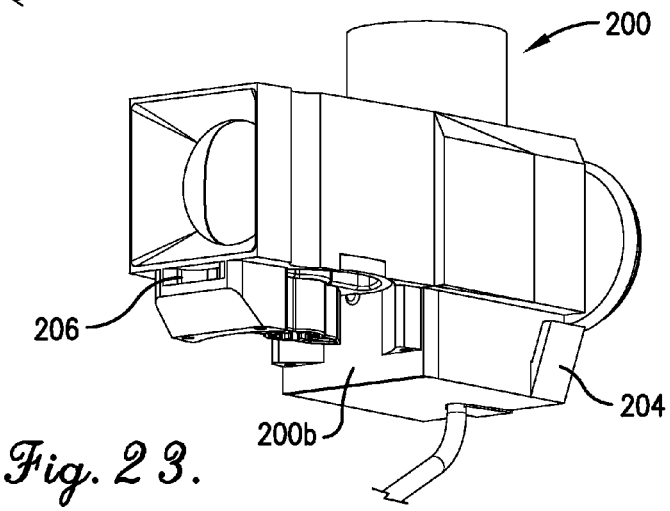
FIG. 23 is an inboard end perspective view of the second embodiment of outlet module of FIG. 22.

For example, FIGS. 22 and 23 show an alternative embodiment wherein outlet module 200 has an extra inlet 202 by which additional products such as dry or liquid fertilizer, other types of seeds, or other substances could be added to the secondary stream exiting the plenum of distribution head 42. Module 200 may or may not have an internal shut-off valve, and may or may not be provided with a flow sensor. Nonetheless, module 200 still has a body that is configured the same as the module 54 with respect to the way it seats within seat opening 64. It will be noted in this respect that the bottom half 200b of module 200 is the same configuration as the bottom half 54b of module 54, barbs 204 are the same configuration as barbs 82 of module 54, and recess 206 is the same configuration as recess 80 of module 54. The overall size of module 200 is the same as module 54 such that a distribution head may contain a mixture of different types of the modules if desired.

FIGS. 24 and 25 illustrate another alternative embodiment wherein an outlet module 300 does not have the usual type of horizontal discharge tube for the secondary stream leaving the module but instead is provided with a downwardly projecting discharge tube 302. Once again, module 300 may or may not have a shut-off valve and may or may not have a flow sensor. But with respect to its modular mounting aspects, it is the same as modules 200 and 54. Note in this respect that the bottom half 300b of module 300 is the same configuration as the bottom half 54b of module 54 and the bottom half 200b of module 200, barbs 304 are the same configuration as barbs 82 of module 54 and barbs 204 of module 200, and recess 306 is the same configuration as recess 80 of module 54 and recess 206 of module 200. The overall size of module 300 is the same as module 54 and module 200 such that a distribution head may contain a mixture of different types of the modules if desired.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A seed distribution tower comprising:
an upright conduit for conveying a combination of seeds and air in a primary stream toward an upper end of the conduit;
a distribution head at said upper end of the conduit for receiving the primary stream from the conduit and splitting the primary stream into a plurality of secondary streams,
said distribution head including a plenum chamber and a plurality of discharge outlets for directing the secondary streams out of said plenum chamber,
said distribution head further including a support; and
a plurality of hoses connected to said discharge outlets for delivering the secondary streams to remote locations,
at least certain of said discharge outlets each comprising an outlet module individually removably mounted on said support at a location between said plenum chamber and said hoses.

2. A seed distribution tower as claimed in claim 1,
further comprising a latch releasably securing the outlet module to the support.

3. A seed distribution tower as claimed in claim 2,
said latch being manually shiftable between alternative latching and releasing positions.

4. A seed distribution tower as claimed in claim 3,
said latch being yieldably resilient for manual flexing movement between said latching and releasing positions.

5. A seed distribution tower as claimed in claim 4,
said latch being yieldably biased toward said latching position.

6. A seed distribution tower as claimed in claim 3,
said latch being on said outlet module.

7. A seed distribution tower as claimed in claim 1,
said support having a plurality of seats for receiving respective ones of said outlet modules.

8. A seed distribution tower as claimed in claim 7,
said support comprising a plate,
each of said seats comprising an opening in the plate that is sized and configured to complementally receive a lower portion of said outlet module at the seat,
each of said outlet modules including an upper portion that is configured to overlie surface areas of said plate adjacent the opening to remain unreceived by the opening.

9. A seed distribution tower as claimed in claim 8,
said distribution head further comprising a lid at least partially overlying said outlet modules.

10. A seed distribution tower as claimed in claim 8,
further comprising a latch releasably securing each outlet module to the support plate.

11. A seed distribution tower as claimed in claim 10,
said latch being manually shiftable between alternative latching and releasing positions.

12. A seed distribution tower as claimed in claim 11,
said latch being yieldably resilient for manual flexing movement between said latching and releasing positions.

13. A seed distribution tower as claimed in claim 12,
said latch being yieldably biased toward said latching position.

14. A seed distribution tower as claimed in claim 12,
said latch comprising a resilient barb on said lower portion of the outlet module disposed to underlie a surface area of the plate adjacent said opening when the resilient barb is in said latching position,
said resilient barb being disposed to clear said surface area of the plate and align with said opening when the resilient barb is manually flexed to said releasing position.

15. A seed distribution tower as claimed in claim 14,
said plate having a projecting tab on an edge of said opening,
said outlet module having a notch releasably receiving said projecting tab.

16. A seed distribution tower as claimed in claim 1,
at least one of said outlet modules having a valve shiftable between a pair of alternative positions opening and closing said at least one outlet module.

17. A seed distribution tower as claimed in claim 16,
said valve having an electrically operated actuator for effecting said shifting of the valve.

18. A seed distribution tower as claimed in claim 17,
at least one of said outlet modules having a sensor for detecting the passage of seeds through said at least one outlet module.

19. A seed distribution tower as claimed in claim 1,
at least one of said outlet modules having a sensor for detecting the passage of seeds through said at least one outlet module.

* * * * *